United States Patent [19]

McCarthy

[11] 4,354,144

[45] Oct. 12, 1982

[54] TRANSMISSIONLESS DRIVE SYSTEM

[76] Inventor: Milton E. H. McCarthy, 359 Warwick Ave., Ormond Beach, Fla. 32074

[21] Appl. No.: 344,682

[22] Filed: Feb. 1, 1982

Related U.S. Application Data

[63] Continuation-in-part of Ser. No. 171,797, Jul. 24, 1981.

[51] Int. Cl.³ .............................................. H02P 1/16
[52] U.S. Cl. ....................................... 318/13; 318/49; 318/76; 318/149; 318/655; 74/710; 74/847; 180/65 B; 290/14
[58] Field of Search .................. 74/710, 713, 847, 857, 74/859; 180/65 B, 65 E, 65 C, 65 R, 70 R; 290/14; 318/13, 14, 45, 47, 48, 49, 72, 76, 91, 140, 149, 153, 655

[56] References Cited

U.S. PATENT DOCUMENTS

| | | | |
|---|---|---|---|
| 2,179,364 | 11/1939 | Weber | 318/13 |
| 2,480,065 | 8/1949 | Wanner | 318/13 |
| 2,795,747 | 6/1957 | Wellington et al. | 318/13 |
| 2,796,565 | 6/1957 | Walcott | 318/76 |
| 2,924,767 | 2/1960 | Myles | 318/76 |
| 2,951,397 | 9/1960 | Schroeder | 318/13 |
| 3,084,579 | 4/1963 | Melville | 318/13 |
| 3,202,893 | 8/1965 | Arp et al. | 318/13 |

*Primary Examiner*—J. V. Truhe
*Assistant Examiner*—Richard M. Moose
*Attorney, Agent, or Firm*—Duckworth, Allen, Dyer & Pettis

[57] ABSTRACT

A continuously variable transmissionless drive system providing maximum torque at low speeds. The system is usable in a hybrid vehicle having a prime mover, such as an internal combustion engine, operated at its optimum rpm for efficiency. The prime mover drives a pair of amplidynes which in turn operate a pair of dc motors to produce rotation of the output shaft for driving the wheels of the vehicle via a novel differential drive system which drives the output shafts in which the effective gear ratio may be externally controlled to vary from a very high step down ratio producing very high torque to a one-to-one ratio for driving at a constant speed. Each drive motor is connected to a separate bevel gear in the differential and control of the output shaft speed and torque is obtained by controlling the speed and direction of rotating of the bevel drive gears. When the two bevel drive gears are rotating at the same rpm but in opposite directions, no output is obtained from the output shafts of the differential unit. When there is a difference in speed between the two bevel drive gears, a spider assembly in the differential unit will rotate at an rpm equal to one-half of the difference in the speeds of the two bevel drive gears and will drive the output shafts at that rpm. The speeds of the motors are controlled by controlling two closed loop servo systems including the amplidynes using two rpm reference signals produced by a network of synchros and small dc control motors. The dc control motors are responsive to signals generated by a foot pedal control operating an acceleration control system.

16 Claims, 7 Drawing Figures

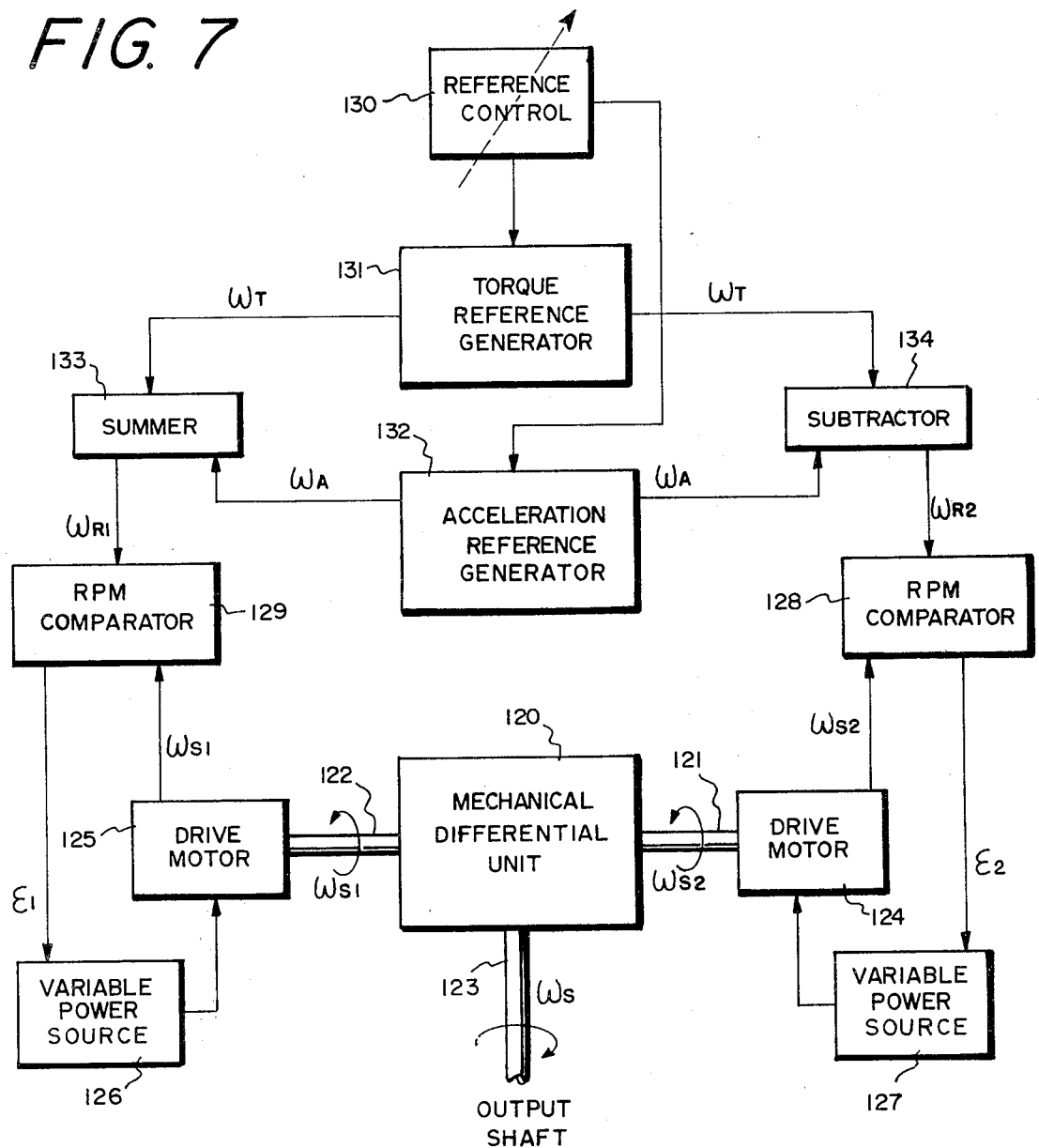

TRANSMISSIONLESS DRIVE SYSTEM

This application is a continuation-in-part of co-pending patent application Ser. No. 171,797, filed July 24, 1981.

BACKGROUND OF THE INVENTION

1. Field of the Invention

The invention relates to drive systems and more particularly to a transmissionless drive system for vehicles or the like in which high torque is created during startup, and the torque reduced as the vehicle obtains the desired velocity.

2. Description of the Prior Art

Automotive vehicles which utilize internal combustion engines have, as is well known, the wrong torque characteristics for such service. Internal combustion engines produce low torque at low rpm while high torque at low rpm is required by vehicles to overcome inertia when starting. To be able to produce the necessary torque when starting, engines having excessive horsepower over that needed at cruising speeds are required. Such engines tend to be inefficient in the use of fuel since it is very difficult to operate the engine at its most efficient operating point. Furthermore, to achieve the necessary torque to the drive shaft and differential of a vehicle, either manual or automatic transmissions are presently required. These units add to the cost and maintenance of the vehicles as well as to increase frictional losses and further reduce the efficiency.

There have been attempts to produce vehicle drive systems using a diesel engine or gasoline engine as a prime mover operating at a constant rpm at a point that produces maximum efficiency. The prime mover may drive electrical generators which furnish electrical power to drive motors. While these arrangements have been proven useful for railroad locomotives, large construction equipment and similar vehicles, generally the size of the motors and controls have limited the use thereof in automobiles for civilian use. Electrical cars have been proposed and attempted which utilize storage batteries that may be charged from an internal combustion engine or from the power line during periods of non use. However, no system is known that is easily adapted to small passenger vehicles which permits the use of a gasoline or diesel type engine driving an electrical generator which may then be controlled to control the acceleration and speed of the vehicle.

SUMMARY OF THE INVENTION

My invention is a novel hybrid vehicle having a prime mover which may be a gasoline or diesel engine operated at the constant speed for which the prime mover is most efficient. The prime mover may drive one or more amplidynes which in turn may operate dc motors of the power type which produce rotation of the output shafts for driving the wheels in a vehicle. An important element of my invention is a novel differential drive system for driving the output shafts in which the effective gear ratio may be externally controlled to vary from a very high step down ratio to a one-to-one ratio. The differential drive does not involve changing of gears or the like.

Control of the differential drive system is obtained by controlling the speed of rotation of two bevel drive gears in the differential. A dc servo motor is connected to each of such gears with each motor being independently controllable. When the two drive gears are rotating at the same rpm but in opposite directions, no output is obtained from the output shafts of the differential unit. However when there is a difference in speed between the two drive gears, a spider assembly in the differential unit will rotate at an rpm equal to one half of the difference in the speeds of the two drive gears.

Advantageously, amplidyne type generators are provided for driving the two dc drive motors. The control elements of the amplidynes are controlled through a network of synchros and two small fractional horsepower dc control motors from signals generated by a foot pedal control and an acceleration control. One control motor, which may be considered to permit high torque, operates at a maximum speed while the vehicle in which the system may be installed is at rest and a second control motor which controls the acceleration of the vehicle will be stationary at rest. The two motors drive various synchro generators and control transformers which furnish control signals to the amplidynes. The operator of the vehicle may, by depressing a foot pedal control, cause the acceleration motor to increase in rpm and a torque motor to decrease in rpm. These differences cause the associated synchros to produce control signals which will cause a change in speed of the servo drive motors thereby causing the differential spider to rotate, transmitting power to the vehicle drive wheels. Since the drive motors are operating at relatively high speeds and the rate of rotation of output shafts will be low for small differences in the speed of the two drive motors, extremely high torque is generated under such conditions. As the acceleration control motor speed is increased and the torque control motor speed is reduced, the output rpm increases and the torque decreases. At a certain relationship of rpms of the control motors, a one-to-one ratio from the drive motors to the output shafts is obtained. When it is desired to decelerate, the foot pedal control is released and the opposite action takes place in that the two drive motors approach the same rotational velocity, the torque greatly increases and the output shaft rpm is reduced. This action also advantageously provides dynamic braking.

As may now be understood, my invention as applied to a hybrid vehicle includes a group of integrated computers. The foot pedal and acceleration control represent a computer element for calculating the required velocities of the torque and control motors for a selected condition. The synchro generators and control transformers measure the difference between the velocity of the servo drive motors and their required velocities producing appropriate error signals. These error signals are amplified and control the two amplidyne generators to change the speed of the servo drive motors to the points at which the error signals go to zero.

As may be recognized, the system may be operated at high efficiency since the engine may operate at its optimum rpm, the amplidyne and drive motor units may be very efficient and no energy is lost in the manual or automatic transmission since very high torque is obtained by use of the novel differential unit of my invention. In addition, the control system elements may all be small, low cost units having negligible power consumption. The drive system is applicable to many uses in addition to that of a passenger vehicle. For example, it is ideal for marine use, for construction equipment, distribution of power to various machines and the like, and other similar applications where precise control and high efficiency is required.

It is therefore a principal object of my invention to provide a power transmission system having high efficiency and which produces extremely high torque at low rpm.

It is another object of my invention to provide a power transmission system in which the output rpm may be varied from zero to a maximum desired value without the use of changeable gears or automatic transmissions.

It is yet another object of my invention to provide a drive system utilizing an internal combustion engine operating at an essentially constant and optimum efficiency speed and which will produce very high torque at low rpm.

It is still another object of my invention to provide a drive system having an efficient and effective control system for controlling the output torque and rotational velocity from a foot pedal control or the like.

It is a further object of my invention to provide a novel differential unit in which the torque and rpm of the output shafts is controlled by varying the rotational velocities and directions of two bevel drive gears.

It is still a further object of my invention to provide a drive system for a vehicle or the like having two dc motors for driving the bevel drive gears of the novel differential unit with the motors controllable to vary the output torque and output rpm of the system.

It is another object of my invention to provide a power drive system having a control utilizing two small low power motors in which the output torque and rpm of the system is controlled by varying the output rpms of the two control motors.

These and other objects and advantages of my invention will become apparent from the following detailed description when read in conjunction with the drawings.

BRIEF DESCRIPTION OF THE DRAWINGS

FIG. 7 is a block diagram of a generalized aspect of my invention.

DETAILED DESCRIPTION OF THE PREFERRED EMBODIMENT

Figure 1:
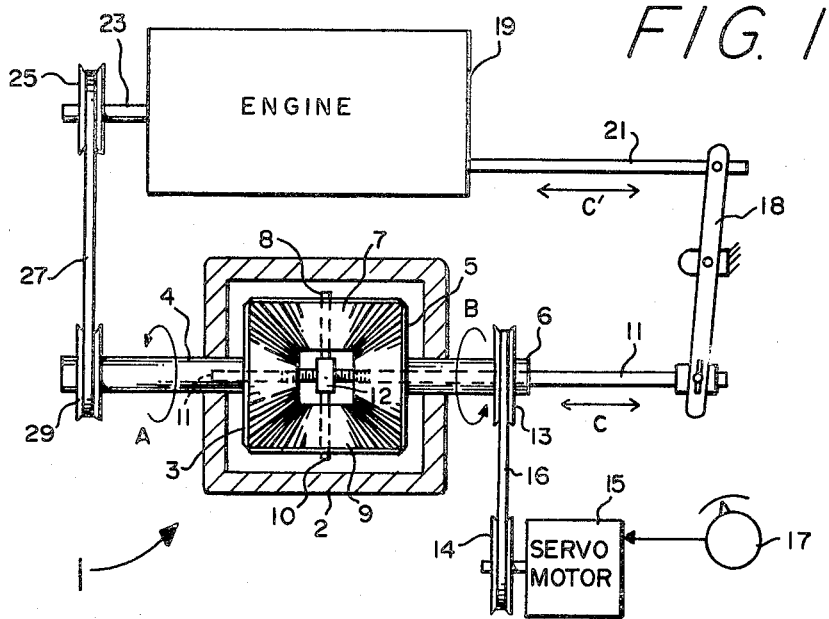
FIG. 1 is a simplified diagram of the novel differential unit of my invention utilized in a governor system for an engine to demonstrate the principle of the differential unit.

The invention is a novel drive system for vehicles and the like in which a high torque can be produced for starting and a high rpm for running without the necessity of a transmission utilizing gears or the like. An important element of the invention is a special differential which is controllable to vary torque and rpm. For a better understanding of the invention, a simplified version of the differential 1 is shown in FIG. 1 as applied to a governor or control system for an engine. Engine 19 may be an internal combustion engine or other type of prime mover. The output shaft 23 of engine 19 is coupled to an input shaft 4 of differential 1 by pulleys 25 and belt 27. Although other ratios can be used, the belt and pulleys will be assumed to have an one-to-one ratio for ease of explanation. Assume that the engine is operating at a speed $S_1$ and turning in a direction to cause shaft 4 to rotate as shown by arrow A. Shaft 4 is connected directly through case 2 shown in cross-section to bevel gear 3 which has a 45 degree bevel. Opposite bevel gear 3 is opposing bevel gear 5 attached to shaft 6 projecting from the opposite side of case 2.

Shaft 6 is coupled to the output shaft of servo motor 15 by pulleys 13 and 14 and belt 16. It will again be assumed that the ratios of pulleys 13 and 14 is one-to-one for this example. The term servo motor as applied to motor 15 and hereinafter, may be a direct current motor capable of efficient operation at any speed from zero to a selected maximum rpm. The speed of servo motor 15 is controlled by a suitable control knob 17 which will permit variation and speed from zero to maximum rpm for which engine 19 is capable.

Assume that servo motor 15 is set to operate at $S_1$ rpm which is equal to the output rpm of engine 19. In this case, bevel gear 5 will be rotating at $S_1$ rpm and in the direction, in accordance with the invention, of arrow B which is opposite from the direction of rotation of bevel gear 3. Thus, gear 3 and gear 5 are rotating at the same speed but in opposite directions. A pair of pinion gears 7 and 9 are disposed in mesh with bevel gears 3 and 5 on a spider shaft formed by shafts 10. Each pinion gear 7 and 9 is free to rotate on its respective shaft 10. The spider shafts 10 are connected to a nut 12 having internal threads through which a threaded shaft 11 is passed through concentric openings in shafts 4 and 6. At the outer end of shaft 11, a throttle control arm 18 is pivotably connected to shaft 11 and is pivoted with respect to the structure supporting engine 19 and differential 1. The opposite end of throttle lever 18 is connected to throttle 21 for engine 19 such that movement of throttle 21 as indicated by arrows C' will vary the speed of engine 19.

As may now be recognized, when bevel gears 3 and 5 are rotating at the same speed and in opposite directions, pinion gears 7 and 9 will be rotating about their own axes in opposite directions and at the same speed having a net difference in rotational speed of zero. The spider remains at rest and therefore, spider nut 12 will remain stationary with the system at equilibrium. If a load is placed on engine 19 tending to slow down the rpm of output shaft 23, gear 3 will be turning slower than gear 5. As a consequence, the axis of gears 7 and 9 formed by shafts 10 will rotate about shaft 11 causing nut 12 to rotate about shaft 11. Due to the lead screw reaction therefrom, shaft 11 will move to the left as indicated by arrow C causing throttle rod 21 to be pulled to the right in a direction C' to increase fuel flow to engine 19 and to therefore increase its speed. At the time the engine reaches the original $S_1$ rpm, and gears 3 and 5 are rotating at equal but opposite speeds, the rotation of the spider assembly will cease and the system will be again at equilibrium. In the event that the load was removed from engine 19 which would thereafter tend to increase in speed, the opposite rotation of spider 10 would occur causing shaft 11 to move to the right tending to close throttle rod 21. As may be now recognized, the system provides an effective governor. If it is desired to change the speed of engine 19 then it is only necessary to vary the speed of servo motor 15 to a new rpm, for example, $S_2$ rpm and the difference in speed between bevel gear 3 operating at $S_1$ and bevel gear 5 operating at $S_2$ will cause movement of shaft 11 to cause engine 19 to thereafter assume speed $S_2$ at equilibrium.

As will be clear at this point, the transmission assembly 1 and servo motor 15 may be made in a very small size and at low cost since only a minimum of power is normally necessary to control throttle rod 21. Suitable damping may be included in differential 1 to minimize overshoot and to thereby produce a stable governor system.

Having now described the basic principal of the differential used in my invention, a preferred embodiment of the variable drive system in accordance with the invention will be described with reference to FIGS. 2 and 3. Turning first to FIG. 3, a housing 22 of a double differential gear system 20 is shown open and partially cut away and with certain of the gears shown in cross-section. A double differential utilizes hollow drive shafts 24 and 26 turning in bearings 32. Output drive shafts 30 and 28 operate within hollow drive shafts 24 and 26. Although not indicated for clarity, suitable bearings would be provided between the inner surfaces of shaft 26 and the outer surfaces of shaft 30 and for the similar pair 28 and 24. Bevel gear 34 is pinned to shaft 24, and bevel gear 36, shown in cross-section, is pinned to shaft 26 shown in cross-section. Bevel gear 34 and 36 will be referred to as the drive gears.

Spider assembly 42 is provided shown in cross-section having transverse shaft 52 upon which pinion gears 40 and 38 may rotate. As may now be recognized, drive gears 34 and 36 may be driven by the respective shafts 24 and 26 to rotate in opposite directions; for example, with shaft 24 rotating in a direction indicated by arrow E and shaft 26 rotating in the direction indicated by arrow F. Alternatively, both gears 34 and 36 may be driven to rotate in the same direction as by arrows E, or as by arrows F. For the case in which drive gears 34 and 36 rotate at opposite and equal speeds, pinion gears 38 and 40 will also rotate about shaft 52 and spider assembly 42 will remain stationary. When there is a velocity difference between drive gear 34 and drive gear 36, spider 42 will be caused to rotate in a direction dependent on the respective directions of gear 34 and 36.

To this point, as may be seen, operation is the same as that described with respect to FIG. 1. A second differential is provided within the drive gear assembly formed by output bevel gears 44 and 46 with output pinion gears 48 and 50. Output gear 44 is pinned to output shaft 28, concentric with input shaft 24, and output gear 46 is pinned to output shaft 30, concentric with input shaft 26. Output pinion gears 48 and 50 are mounted on the inner portions of fixed shaft 52 in mesh with output gears 44 and 46. When spider assembly 42 is stationary, gears 48 and 50 will be stationary with the result that output shafts 28 and 30 are not turning. When spider 42 rotates due to a difference in velocity between drive gears 34 and 36, pinion gears 48 and 50 will cause bevel gears 44 and 46 to rotate driving shafts 28 and 30 as a unit, indicated by arrows D and G. When used to drive a vehicle, the inner differential permits shafts 28 and 30 to operate at different velocities such as when turning and the like.

As may now be noted, the rpm of output shafts 28 and 30 will be determined by the difference in rpm between drive gears 34 and 36. For example, if drive gears 34 and 36 are rotating at the same velocity and in opposite directions, shafts 28 and 30 will be stationary. If gear 36, for example, has its rpm reduced, say by 100 rpm, spider assembly 42 will then rotate at one-half the difference in rotational velocity between gears 34 and 36, or at 50 rpm. Therefore, shafts 28 and 30 will rotate at 50 rpm. If the velocity of driving gear 34 were 2,000 rpm and the velocity of driving gear 36 were at 1900, the novel double differential is then acting as a transmission with a step down ratio of 40 to 1. If gear 36 has its rotational velocity decreased further, output shafts 28 and 30 will therefore increase in velocity and the effective gear reduction ratio is reduced. Thus, over a certain range of speed of the drive gears, the double differential may act as a continuously variable ratio transmission. This characteristic of my drive system will be explained in more detail hereinafter.

Summarizing the action of double differential 20, the following relationships are seen to exist:
let $\omega_{24}$ = rpm of shaft 24
$\omega_{26}$ = rpm of shaft 26
$\omega_S$ = rpm of output shafts 28, 30
$+\omega$ = forward rotation
$-\omega$ = reverse rotation
then $$\omega_S = \tfrac{1}{2}(\omega_{24} + \omega_{26}) \qquad (1)$$

It is to be understood that the rpm of output shafts 28 and 30 are equal and in the same direction of rotation when no external torque is applied to the shafts. However, when the vehicle being driven turns a corner, the shafts will experience opposite torques due to the differing turning radii and the differential 20 will react in the normal fashion to cause the inner wheel and shaft to decrease in rpm and the outer wheel and shaft to increase.

Figure 2:
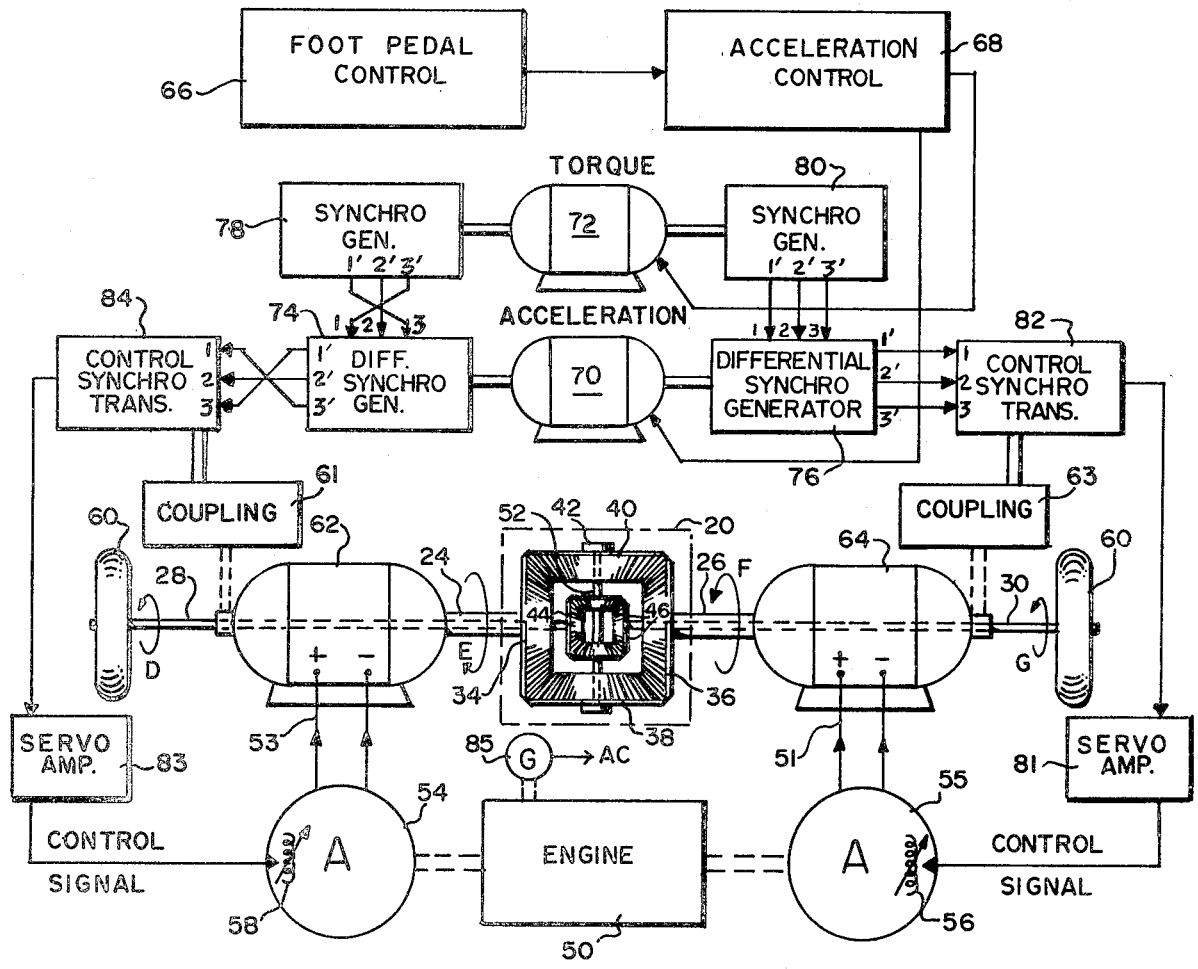
FIG. 2 is a functional block diagram of a system using the differential unit of FIG. 1 modified for application to drive the wheels of a vehicle along with the drive motors and control systems therefor.
Figure 3:
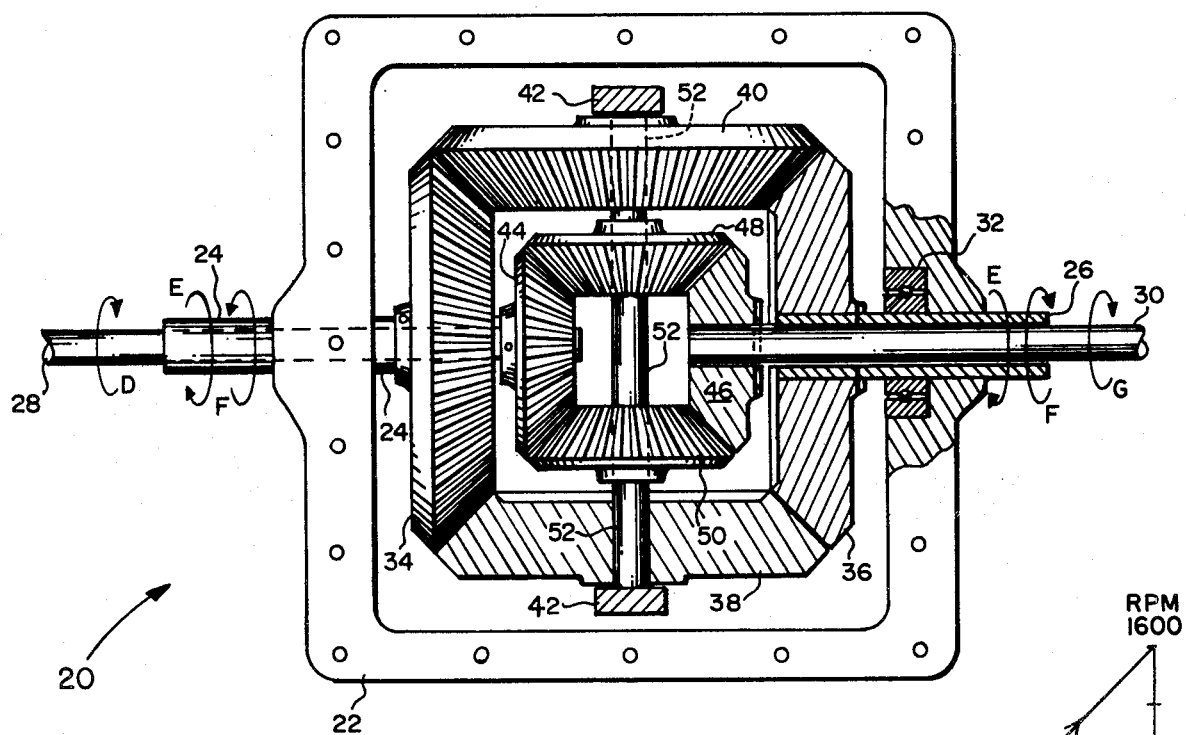
FIG. 3 is a simplified partially cut away diagram of a double differential drive unit such as used in the system of FIG. 2.

In the system of FIG. 2, double differential 20 is shown with output shafts 28 and 30 driving wheels 60 of a vehicle. The prime mover for the vehicle is engine 50 which may be an internal combustion engine such as a gasoline or diesel type or any other desired engine. Engine 50 drives a pair of amplidynes 55, 54 with engine 50 normally operated at an optimum rpm which produces most efficient operation. The drive system to amplidynes 55 and 54 is selected to operate the amplidynes at their optimum rpm. Amplidynes 55 and 54 are well known in the art and produce direct current outputs on leads 51 and 53, respectively. The output power is controlled by control winding 56 in amplidyne 55 and control winding 58 in amplidyne 54. Control windings 56 and 58 are controllable to vary the output of the amplidyne 55 and 54 from zero to their maximum rated values with very low control power being required. Two dc servo motors 62 and 64 obtain power from amplidynes 54 and 55, respectively, and are coupled to differential input shafts 24 and 26, respectively. The velocity of drive gear 34 in double differential 20 is controlled by the output of amplidyne 54 and therefore by the signal applied to control winding 58. Similarly, drive gear 36 driven from dc servo motor 64 may have its rpm controlled by the output from amplidyne 55 as determined by the signal on control winding 56.

Having shown the basic power system for driving wheels 60, the novel control method of my invention will now be described. In accordance with the invention, when the vehicle is standing still, it is required that drive gear 34 and drive gear 36 rotate at the same rpm but in opposite directions as indicated by arrows E and F. For use in the following explanation, it will be assumed that the idling speeds of gears 34 and 36, for no rotation of output shafts 28 and 30, will each be 1,200 rpm in opposite directions. To control the rpm of gears 34 and 36, two fractional horsepower dc servo motors 70 and 72 are utilized for reference purposes. Motor 70 will be termed the acceleration control motor and motor 72 will be termed the torque control motor. For the case in which the vehicle is stationary, acceleration motor 70 will be stationary and torque motor 72 will be running at a selected maximum rpm which, for example, will be considered to be 1,200 rpm. Torque motor 72 drives two synchro generators 78 and 80 having outputs (1', 2', 3') to the inputs (1, 2, 3) of differential synchro generators 74 and 76, respectively. The output of differential synchro generator 74 (1', 2', 3') is connected to the input (1, 2, 3) of control synchro transformer 84. Similarly, the output of differential synchro generator 76 drives the input of control synchro transformer 82. It is to be noted that the phase rotation of the connections between synchro devices 78, 74 and 84 are the reverse of those between synchro devices 80, 76 and 82.

The shaft of control synchro transformer 84 is coupled by coupling 61 to shaft 24 of servo drive motor 62 and the shaft of control synchro transformer 82 is driven by shaft 26 of servo drive motor 64 via coupling 63.

Synchro generators 78, 80, differential synchros 74, 76, and control synchro transformers 82, 84 are excited by a 400 Hz generator 85 which may be an alternator driven by prime mover 50 or by an inverter powered by the vehicle storage battery.

The output from control synchro transformer 84, which represents an error signal $\epsilon_1$, will be amplified by servo amplifier 83 and applied to control winding 58 of amplidyne 54. Similarly, an error signal output $\epsilon_2$ from control synchro transformer 82 drives control winding 56 of amplidyne 55 via servo amplifier 81. As will be evident, the presence of an error signal indicates that the rpm of the drive motor 62 or 64 does not correspond to that called for by the speeds of reference torque and acceleration motors 72 and 70 as will be described below. The phasing of couplings 61 and 63 are such that the control signal changes the output of the particular amplidynes to change the drive motor velocity in a direction and amount to reduce the error voltage to zero. Thus, control synchro transformer 84, servo amplifier 83, amplidyne 54 and coupling 61 represent a closed feedback loop for drive motor 62 with the corresponding units providing a closed loop for drive motor 64, for servo control of the drive motors.

As is apparent, the outputs of synchro generators 78 and 80 are proportional to the speed of torque motor 72 and are algebraically added to the signals in differential synchro generators 74 and 76 proportional to the speed of acceleration motor 70. These additions can be expressed by $$\omega_{R1} = \omega_T + \omega_A \quad (2)$$

$$\omega_{R2} = -(\omega_T - \omega_A) = \omega_A - \omega_T \quad (3)$$

where $\omega_{R1}$ is the rpm reference signal output of differential synchro generator 74, $\omega_{R2}$ is the rpm reference signal from differential synchro generator 76, $\omega_T$ is the rpm of torque motor 72 and $\omega_A$ is the rpm of acceleration motor 70. The positive sign is the reference rotation E of shaft 24 and the negative sign is the opposite rotation.

The relationship between the output shaft rpm and the speed of reference motors 70 and 72 may be seen by combining equations (1), (2) and (3). Since $\omega_{24}$ is required to be the same as $\omega_{R1}$ and $\omega_{26}$ is required to be the same as $\omega_{R2}$, the output shaft speed $\omega_S$ can be expressed as $$\omega_S = \tfrac{1}{2}[-(\omega_T - \omega_A) + (\omega_T + \omega_A)] \quad (4)$$

$$= \omega_A$$

Therefore, the output shaft velocity will follow that of acceleration reference motor 70.

Returning to the example in which acceleration reference motor 70 is stationary and torque reference motor 72 is turning at 1200 rpm, and the vehicle is stationary, the system operation when the vehicle accelerates will be described. For the vehicle to be stationary, as previously discussed, $\omega_{24}$ will be 1200 rpm and $\omega_{26}$ will be $-1200$ rpm. Therefore, output shafts 28 and 30 will be stationary. When it is desired to cause the vehicle to move, acceleration motor 70 is energized by signals from acceleration control 68 responsive to foot pedal control 66 and its rotational velocity will increase essentially linearly. In addition, acceleration control 68 causes torque motor 72 to linearly reduce its rotational velocity proportionately as the rpm of acceleration motor 70 increases.

It is to be understood that the connections between synchro generator 78 and differential synchro generator 74 are such that the rpm's of each add with respect to control synchro transformer 84, whereas the connections between synchro generator 80 and differential synchro generator 76 are such that the rpm's of each subtract with respect to control synchro transformer 82 as expressed by equations (2) and (3). Therefore, the speed of control servo transformer 84 will remain at 1200 rpm for all speeds of motor 70 and 72 until the speed of torque motor 72 becomes zero, while the speed of control synchro transformer 82 will be the difference between the speeds of motors 70 and 72 with the direction of rotation determined by which motor 70 and 72 has the highest rpm. When acceleration motor 70 is operating at a low speed, for example 10 rpm, torque motor 72 will have been reduced in speed to 1,190 rpm. The signal from differential synchro generator 76 to control synchro transformers 82 will produce an error signal $\epsilon_2$ which will result in a reduced output from amplidyne 55 causing drive motor 64 to drop to 1,180 rpm. Since there is now a difference in velocity between drive gear 36 and drive gear 34, pinion gears 38 and 40 will rotate on the spider 42 driving output shafts 28 and 30. The output rpm will be given by equation (1) as (1200−1190) rpm or 10 rpm. Since full power is available from servo motors 62 and 64, it may be recognized that very high torque will be available at wheels 60 as is required to overcome the inertia of a vehicle at rest. As the vehicle accelerates, the operator, by means of foot pedal control 66, causes acceleration motor 70 to continue to increase in velocity as torque motor 72 decreases. Therefore, the rotational speed of servo drive motor 64 will continue to decrease. When the rpm of motor 64 becomes zero, the output rpm of the shafts 28 and 30 will be one-half the velocity of motor 62 or 600 rpm. It may be noted at this time that the rpm of acceleration motor 70 will be 600 rpm and the rpm of torque motor 72 will also be 600 rpm which results in a difference of zero rpm. This condition is considered to be the one-to-one ratio condition since the drive is essentially direct. As may be noted, the rotational velocity of drive motor 64 will be the difference between the velocities of motors 70 and 72.

Figure 4:
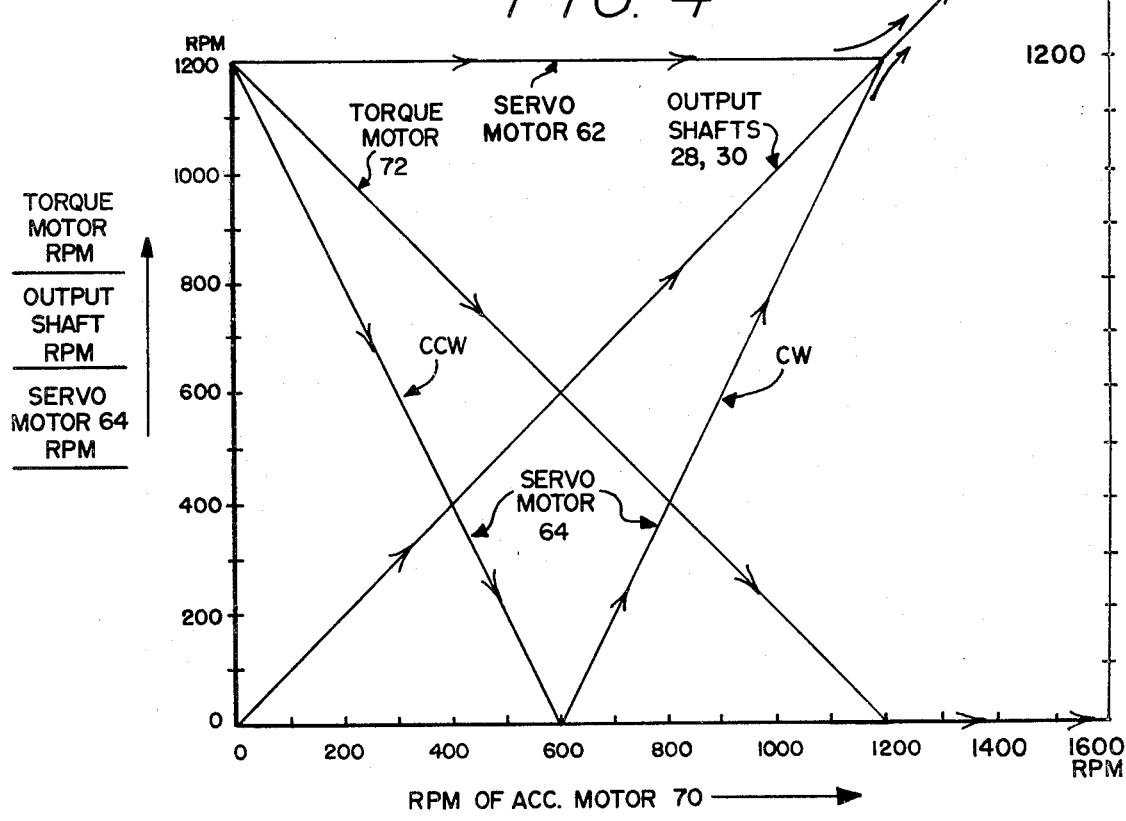
FIG. 4 is a graph to illustrate typical relations among the elements of the power system of FIG. 2.

Referring to Table 1, a typical chart of the relationships in the system of FIG. 2 for various speeds of motors 70 and 72 are indicated while in FIG. 4, a graph of these conditions is shown. Typical values are shown in Table 1 in the first two columns for the rpms of acceleration motor 70 and torque motor 72 with the remainder of the columns indicating the operation of the system in response to the speed of acceleration motor 70. FIG. 4 thus illustrates these effects graphically. As may be noted, when acceleration motor 70 is at zero rpm, the torque motor is at its full speed of 1,200 rpm and variable servo motor 64 is at −1,200 rpm indicating that it is turning in the opposite direction from servo motor 62 which is turning at 1,200. In this case, the output shaft rotational velocity is zero. Then, if the acceleration motor is set to produce one rpm, the acceleration control reduces the speed of torque motor 72 by one rpm to 1,199. Due to the action of the differential synchro generator, the difference between acceleration motor 70 rpm and the torque motor 72 rpm of 1,199 rpm controls servo motor 64 to turn at 1,198 rpm. The output shaft 28 and 30 will then turn at one-half the difference between the speed of servo motor 62 and servo motor 64 which in this case is equal to 1 rpm, the velocity of acceleration motor 70. The drive ratio is calculated by dividing the acceleration motor rpm into the torque motor rpm which gives, for this example, 1,199 to 1 ratio. In the graph of FIG. 4, the rpm of acceleration motor 70 is plotted on the abscissa as the variable, with the torque motor rpm, the output shaft rpm, and the servo motor rpm values plotted on the ordinate. As can now be seen from the table and the graphs, as the acceleration motor rpm varies from zero to 600, servo motor 64, which is rotating in the counterclockwise direction, drops from 1,200 to zero rpm. As the acceleration motor rpm increases from 600 to 1,600, the speed of servo motor 64 increases from 0 to 1,200 rpm in the clockwise direction, with the drive ratio being effectively 1:1 over this latter range. The transmission system thus acts as a high gear from the 600 rpm point and higher. The large drive ratios obtained for the low range of rpms of acceleration motor 70 therefore produced extremely high torque with the torque falling off as the output shaft rpm increases. This produces the ideal torque curve for a vehicle without the necessity of complex automatic transmissions or similar gear reduction devices. To reverse the vehicle, the direction of rotation of acceleration motor 70 is reversed. This, in effect, exchanges the functions of drive motors 62 and 64; i.e., motor 62 will decrease in rpm while motor 64 maintains 1,200 rpm responsive to increase vehicle velocity signals from acceleration control 68 causing the direction of rotation of shafts 28 and 30 to reverse.

TABLE 1

| ACCELERATION MOTOR 70 (RPM) | TORQUE MOTOR 72 (RPM) | SERVO MOTORS 62 (RPM) | SERVO MOTORS 64 (RPM) | OUTPUT SHAFT (RPM) | DRIVE RATIO |
|---|---|---|---|---|---|
| 0 | 1200 | 1200 | −1200 | 0 | — |
| 1 | 1199 | 1200 | −1198 | 1 | 1199:1 |
| 2 | 1198 | 1200 | −1196 | 2 | 599:1 |
| 3 | 1197 | 1200 | −1194 | 3 | 399:1 |
| 10 | 1190 | 1200 | −1180 | 10 | 119:1 |
| 50 | 1150 | 1200 | −1100 | 50 | 23:1 |
| 100 | 1100 | 1200 | −1000 | 100 | 11:1 |
| 200 | 1000 | 1200 | −800 | 200 | 5:1 |
| 400 | 800 | 1200 | −400 | 400 | 2:1 |
| 600 | 600 | 1200 | 0 | 600 | 1:1 |
| 700 | 500 | 1200 | +200 | 700 | 1:1 |
| 900 | 300 | 1200 | +600 | 900 | 1:1 |
| 1200 | 0 | 1200 | +1200 | 1200 | 1:1 |

It is to be understood that examples given above are for explanatory purposes only and the rpm ranges of the various motors may be selected in accordance with the particular application of my invention.

As may now be understood, torque motor 72 and its associated synchros represents a torque reference system, and acceleration motor 70 with its synchros represents an acceleration or drive velocity reference for the invention.

Figure 5:
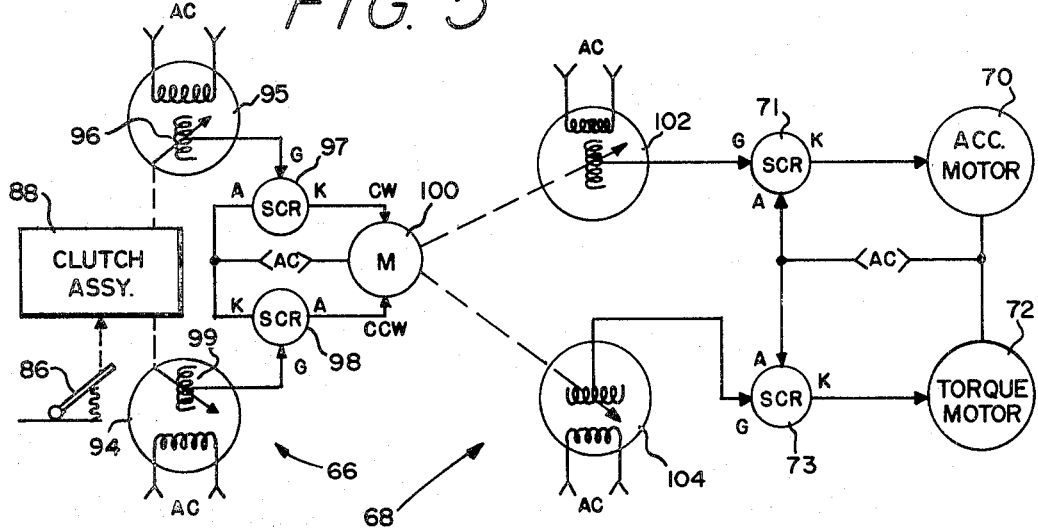
FIG. 5 is a functional diagram of the foot pedal control and acceleration control elements of the power drive system of FIG. 2.
Figure 6:
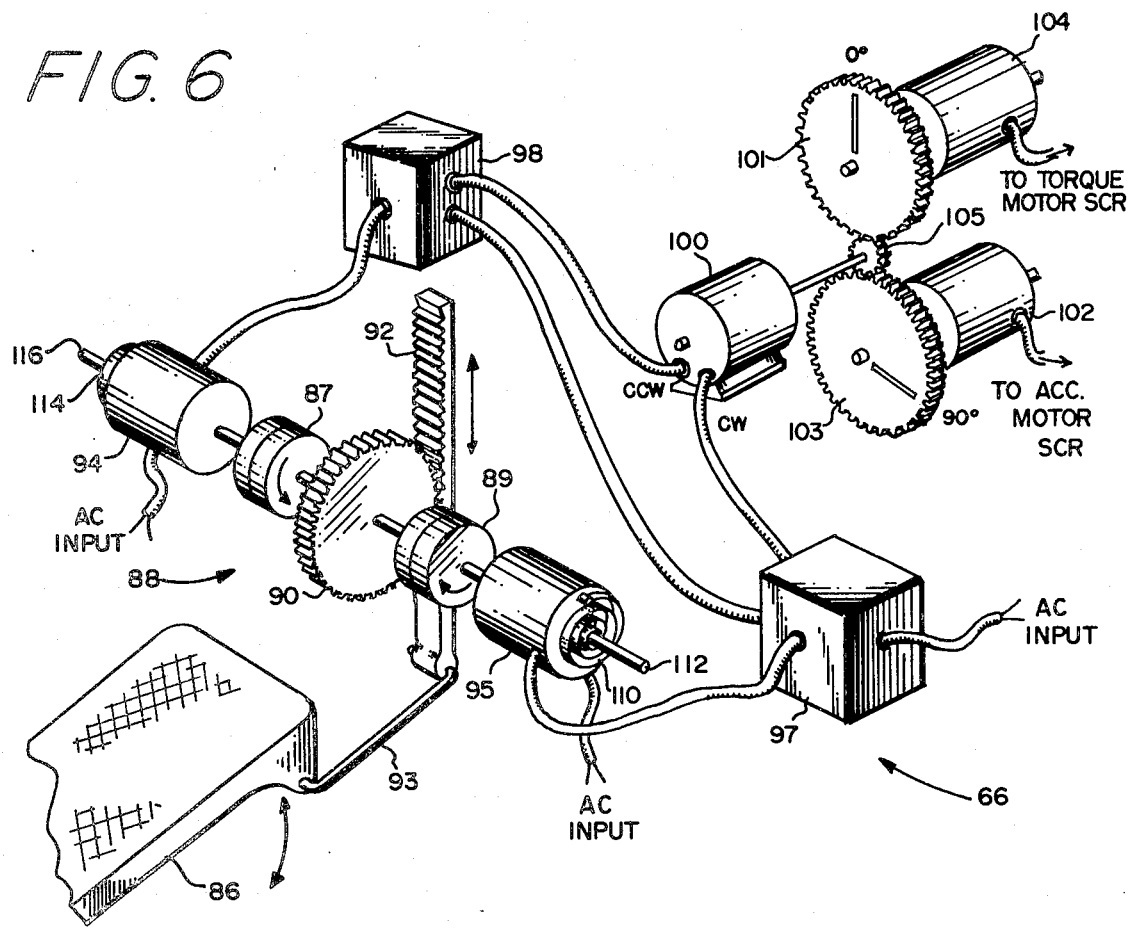
FIG. 6 is a pictorial view of the basic elements of the control system shown in FIG. 5 with the supporting structures and housings omitted for clarity.

Turning now to FIGS. 5 and 6, the operation of foot pedal control 66 and acceleration control 68 will be explained. As is apparent from the above discussion, Table 1, and FIG. 6, the acceleration control functions to increase the rotational speed of acceleration motor 70 at the same time that the rotational speed of torque motor 72 is reduced. Therefore, in starting a vehicle utilizing my invention, the operator will operate a pedal that gradually increases the speed of acceleration motor 70 to provide high torque at the initial starting rpm of the output shaft. As the vehicle accelerates, the torque is reduced and the output rpm is increased. At the point at which the vehicle reaches the desired speed, the acceleration motor 70 rpm and torque motor 72 rpm are to be held constant responsive to the pedal action. Then, when it is desired to decelerate the vehicle, the opposite action is required in which the torque motor 72 rpm is increased and the acceleration motor 70 rpm is decreased. An important feature of my invention is that, as the system decelerates, servo motors 62 and 64 act as generators due to the back emf created as the excitation control is removed therefrom and a dynamic braking action occurs. Therefore, the foot pedal control system 66 is adapted to permit automatic braking as the operator relieves pressure on the foot pedal. The dynamic braking action is effective in greatly reducing wear and maintenance of the usual friction braking system necessary to hold the vehicle when there is no power to the driving motors.

FIG. 5 is a functional block diagram arrangement of foot pedal control 66 and acceleration control 68. Foot pedal 86 is operated by the driver to cause the vehicle to accelerate to a given speed, to maintain a desired speed, and to decelerate when required. Due to the inherent dynamic braking characteristic of the vehicle drive system of the invention, pedal 86 also acts to cause braking. Pedal 86 is operative through a clutch assembly 88, to be described hereinafter, to operate a single-phase synchro 95 during acceleration, and a single-phase synchro 94 during deceleration. Synchros 94 and 95 have stator or fixed windings excited by an ac voltage which may be, for example, 26 volts at 400 Hz, produced by generator 85 driven by engine 50 as seen in FIG. 2. In their unoperated positions, rotors 96 and 99 of synchros 95 and 94 are in neutral position with respect to the stator windings such that the output voltage is 90° out of phase with the excitation voltage. As a rotor winding, such as winding 96 of synchro 95, is rotated, this phase difference of the voltage across the rotor winding 96 will be reduced. The output voltage from winding 96 is fed to the gate electrode of silicon controlled rectifier (SCR) 97. Ac from generator 85, which is in phase with the synchro excitation, is applied to the anode of SCR 97 which has its cathode connected to a clockwise rotation winding of dc motor 100. Motor 100 may be of a type in which the speed of the motor is controlled by the dc voltage applied. Thus, as the phase of synchro winding 96 increases due to operation of pedal 86, the conduction angle of SCR 97 will increase and motor 100 will rotate in the clockwise direction. This action will ultimately cause the drive system of the invention to accelerate the vehicle.

When pressure is released slightly on pedal 86, clutch assembly will disengage and synchro 95 will be returned to its neutral position or out-of-phase condition. Thus, the conduction angle of SCR 97 will be reduced to zero and motor 100 will stop. This results in the drive system operating at a constant rpm and the vehicle will maintain its speed at that point. When the operator desires to decelerate, he allows pedal 86 to return to its unoperated position. Clutch assembly 88 is operative to cause the rotor winding 99 of synchro 94 to rotate, reducing the phase difference with respect to the excitation on its fixed winding. In this instance, the phase of the output voltage on the gate electrode of SCR 98 causes conduction, applying dc to motor 100 but with the opposite polarity causing motor 100 to operate in the counterclockwise direction. This operation ultimately causes the drive system to reduce its rpm and therefore to slow the vehicle down. When pedal 86 is returned to its non-operated position, clutch assembly 88 releases the connection to synchro 94 which returns to its neutral position stopping motor 100.

Motor 100 is mechanically linked to single-phase synchros 102 and 104. The rotors of these synchros are aligned with their fixed, or stator, windings when pedal 86 is in the neutral position and the vehicle is at rest in the manner shown in FIG. 5. That is, the rotor of synchro 102 is oriented 90° with respect to the fixed winding and therefore the output voltage across that winding is 90° out-of-phase with the excitation voltage. Conversely, synchro 104 has its rotor winding parallel or exactly aligned with the stator winding and therefore produces an in-phase output voltage while the vehicle is at rest. The rotor windings of synchros 102 and 104 are connected to the gate controls of SCR 71 and SCR 73, respectively. In the at-rest condition, SCR 73 is fully conducting and rectifying the applied ac voltage to operate torque motor 72 at its maximum rpm. Since the voltage produced in the rotor winding of synchro 102 is out-of-phase with the excitation, SCR 71 is non-conducting and acceleration motor 70 is not turning. The action of motor 100, when energized in the clockwise direction, is to rotate the rotor winding of synchro 102 with respect to the stator winding to thereby cause an in-phase voltage to appear across that winding. Simultaneously, the rotor winding of synchro 104 is rotated away from its in-phase position with a result that the dc output voltage phase is increasing from synchro 102 and decreasing from synchro 104. This action causes SCR 71 to conduct and to apply dc to acceleration motor 70 causing that motor to rotate and, at the same time, reduces the conduction time of SCR 73 reducing the dc applied to torque motor 72 and thereby reducing its rpm. This action therefore produces the difference in rotational velocities of acceleration motor 70 and torque motor 72 required to cause the drive system to produce a high torque when starting.

As motor 100 continues to turn in response to continued pressure on pedal 86, the difference in rotational velocities between acceleration motor 70 and torque motor 72 continues to increase with a continuing reduction in gear ratio and an increase in output shaft velocity of the drive system of the invention. When the vehicle obtains the desired forward speed, release of pressure on pedal 86 results in motor 100 stopping as described above which maintains synchros 102 and 104 in their rotated positions to maintain a selected difference in rotational velocities of motors 70 and 72. Thus, the vehicle will continue to run at a fixed speed. When the pedal 86 is released, as previously described, motor 100 is controlled to operate in the counterclockwise direction which rotates the rotors of synchros 102 and 104 to turn back toward their at-rest position. Thus, as the signals on the gates of SCR 71 and 73 change, their conduction angles change, reducing the rotational velocity of accelertion motor 70 and increasing that of torque motor 72 until the original at-rest positions of synchros 102 and 104 are reached. At that time, SCR 71 is non-conducting and SCR 73 is full conducting.

Having explained the function of foot control 68 and acceleration control 68, an exemplary mechanical configuration of the elements thereof may be noted from FIG. 6, with the various components shown in their operative positions but with the frame and supporting structures and the like omitted for clarity. Pedal 86, shown in partial view, is coupled to a rack 92 by link 93 such that pressing and releasing of pedal 86 will cause rack 92 to move up and down vertically as indicated by the arrow. Although not shown, pedal 86 may be considered to be spring loaded such that in the at-rest position, rack 92 is at or near the top of its travel. Thus, when foot pressure is placed on pedal 86, rack 92 is pulled downward. Rack 92 is coupled to gear 90 which is therefore rotated in a clockwise direction in the view of FIG. 6. Clutch assembly 88 comprises two slip clutches 87 and 89. As gear 90 rotates in the clockwise direction, clutch 89 is operative to couple the shaft of gear 90 to shaft 112 of synchro 95. It may also be noted that synchro 95 includes a spiral spring 110 which maintains shaft 112 against a stop in its normal or unoperated position such that the rotor of synchro 95 is 90° out-of-phase with the stator winding and therefore there is no output from SCR 97. When clutch 89 engages the shaft 112, it is rotated clockwise causing SCR 97 to conduct and to energize motor 100 which rotates pinion gear 105 in the clockwise direction.

In FIG. 6, synchros 102 and 104 are shown driven by gears 103 and 101, respectively, with an index line provided on the gears to indicate the phase relationship between the rotor and the stators in the at-rest position. As will be noted, synchro 102 has its rotor in the 90° position producing no output to the accelerating motor control SCR. Synchro 104, however, is shown with its rotor in-phase with the stator and therefore will cause the torque motor SCR to be fully conducting. As pinion 105 rotates, it will turn the rotor of synchro 104 toward an out-of-phase condition, reducing the power to torque motor 72 and will tend to bring the rotor of synchro 102 in phase which will cause acceleration motor 70 to increase in its rotational velocity. When the vehicle achieves the desired speed, and the operator releases pressure on pedal 86, slip clutch 89 will release and slip, permitting spiral spring 110 to return shaft 112 to its neutral position. This immediately stops motor 100 which leaves gears 101 and 103 in the position they had attained during acceleration. Therefore, the drive system of the invention will continue to operate at the rpm achieved during acceleration. When the operator desires to decelerate, he permits pedal 86 to return toward its at-rest position thereby causing rack 92 to move upward and to rotate gear 90 in the counterclockwise direction. This motion causes slip clutch 87 to engage and to rotate shaft 116 of synchro 94. Shaft 116 is coupled to spiral spring 114 which normally holds shaft 116 in the out-of-phase position. As shaft 116 rotates however, the rotor of synchro 94 is turned to cause SCR 98 to begin to conduct and to operate motor 100 in the counterclockwise direction. Thus, gears 101 and 103 are rotated back toward their at-rest position slowing acceleration motor and increasing the speed of the torque motor. As the vehicle slows to a stop, the operator then completely removes pressure from pedal 86 which causes slip clutch 87 to release and shaft 116 to return to its at-rest position. This cuts off the power to motor 100 and will occur at the time that gears 101 and 103 are back to their at-rest position.

It should be understood that the synchros and motor shown in FIG. 6 may be of the miniature or subminiature type and may be selected to draw very little power since their purpose is to generate control signals only. Therefore, the components are relatively inexpensive and will consume negligible energy from the system.

Having described in detail the preferred embodiment of my invention, a more generalized aspect will be discussed with reference to FIG. 7. A mechanical differential unit 120 includes two input driving shafts 121, 122 and an output shaft 123. Shaft 122 is driven by drive motor 125 at a rotational velocity of $\pm\omega_{S1}$ and shaft 121 is driven by drive motor 124 at a rotational velocity $\pm\omega_{S2}$ where the algebraic sign indicates the direction of rotation. The speed of output shaft 123 will depend on both the speeds and directions of shafts 121 and 122. When shafts 121 and 122 are rotating in the same direction, output shaft 123 will rotate at one-half the sum of $\omega_{S1}$ and $\omega_{S2}$. When shafts 121 and 122 are rotating in opposite directions, output shaft 123 will rotate at one half the difference between $\omega_{S1}$ and $\omega_{S2}$.

Drive motors 125 and 124 are operated by variable power sources 126 and 127 respectively. Power sources 126 and 127 are each controlled by a closed feedback loop. Drive motor 125 provides an rpm signal $\omega_{S1}$, proportional to its rpm, to rpm comparator 129 which compares $\omega_{S1}$ to rpm reference signal $\omega_{R1}$ and produces an error signal $\epsilon_1$ when $\omega_{S1} \neq \omega_{R1}$. Error signal $\epsilon_1$ varies the output to drive motor 125 of power source 126 in the direction to reduce $\epsilon_1$ to zero. Similarly, rpm comparator 128, drive motor 124 and variable power source 127 provides a closed loop servo system for driving shaft 121 with $\omega_{R2}$ providing the rpm reference for drive motor 124.

To produce rpm reference signals $\omega_{R1}$ and $\omega_{R2}$, I utilize a torque reference generator 131 having an output $\omega_T$ and an acceleration reference generator 132 having an output $\omega_A$. Reference control 130 provides manual control of generators 131 and 132. $\omega_{R1}$ is produced by algebraically summing outputs $\omega_T$ and $\omega_A$ in summer 133 and $\omega_{R2}$ is produced by algebraically subtracting $\omega_T$ and $\omega_A$ in subtraction 134.

In accordance with my invention, the rotational speed $\omega_S$ of output shaft will be equal to $\omega_A$, the acceleration reference produced by acceleration reference generator 132. Thus, reference control 130 may cause $\omega_A$ to vary from zero to the maximum desired speed. The torque produced at output shaft 123 is controlled by the ratio of $\omega_A$ to $\omega_T$ with a gear reduction ratio achieved when $\omega_A$ is less than $\omega_T$ and a 1:1 or straight drive when $\omega_A$ is equal to or greater than $\omega_T$.

I have disclosed my novel transmissionless drive system with reference to a specific and preferred embodiment. However, it will be apparent to those of skill in the art to apply the principles of my invention to other applications and embodiments, and to various changes without departing from the spirit and scope thereof.

I claim:

1. A vehicle driving system comprising:

a mechanical differential means having a first input shaft for being driven at a rotational speed of $\pm\omega_{S1}$, a second input shaft for being driven at a rotational speed of $\pm\omega_{S2}$, and an output shaft, said differential means for driving said output shaft at a rotational speed $\omega_S = \frac{1}{2}(\pm\omega_{S1} \pm \omega_{S2})$ where the algebraic sign indicates direction of rotation;

a first controllable speed drive motor connected to said first input shaft for rotation thereof;

a second controllable speed drive motor connected to said second input shaft for rotation thereof;

a first power source connected to said first drive motor, said first power source including control means for controlling the speed of said first drive motor;

a second power source connected to said second drive motor, said second power source including control means for controlling the speed of said second drive motor;

first rpm comparison means connected to said first drive motor for sensing the rpm $\omega_{M1}$ thereof and having an input for receiving an rpm reference signal $\omega_{R1}$, said comparison means for producing a first output error signal proportional to $\omega_{R1} - \omega_{M1}$ at an output thereof, said output connected to said control means of said first power source whereby said first drive motor, said first power source, and said first comparison means forming a first closed loop servo system;

second rpm comparison means connected to said second drive motor for sensing the rpm $\omega_{M2}$ thereof and having an input for receiving an rpm reference signal $\omega_{R2}$, said second comparison means for producing a second output error signal proportional to $\omega_{R2} - \omega_{M2}$ at an output thereof, said output connected to said control means of said second power source whereby said second drive motor, said second power source, and said comparison means forming a second closed loop servo system;

torque reference means for producing a selectable torque rpm reference signal $\omega_T$;

acceleration reference means for producing a selectable acceleration rpm reference signal $\omega_A$;

first calculation means connected to said torque reference means and said acceleration reference means for calculating said rpm reference signal $\omega_{R1}$ from the algebraic sum of $\omega_T$ and $\omega_A$, said first calculation means having an output for said sum connected to said input of said first rpm comparison means; and second calculation means connected to said torque reference means for calculating said rpm reference signal $\omega_{R2}$ from the algebraic difference of $\omega_T$ and $\omega_A$, said second calculation means having an output for said difference connected to said input of said second rpm comparison means;

whereby said output shaft rotates at a rotational speed $\omega_S$ equal to the rpm represented by acceleration rpm reference signal $\omega_A$.

2. The system as defined in claim 1 in which the torque at said output shaft is controlled by the ratio of $\omega_T$ to $\omega_A$.

3. The system as defined in claim 2 in which a step down ratio is obtained when $\omega_A$ is less than $\omega_T$ and a one-to-one ratio is obtained when $\omega_A$ is equal to or greater than $\omega_T$.

4. A transmissionless drive system for vehicles having a pair of vehicle drive wheels, said system comprising in combination:

a prime mover;

first and second amplidynes each having a control input, said amplidynes connected to and driven by said prime mover;

a first drive motor electrically connected to the dc output of said first amplidyne;

a second drive motor electrically connected to the dc output of said second amplidyne;

a double differential unit having a first differential portion comprising a first bevel gear driven by said first drive motor, a second bevel gear driven by said second drive motor, a first pair of pinion gears differentially driven by said first and second bevel gears, and a spider assembly for supporting said pair of pinion gears, and a second differential portion comprising a second pair of pinion gears supported by said spider assembly, a third bevel gear connected to a first output shaft, said first output shaft connected to a first of said pair of drive wheels, a fourth bevel gear connected to a second output shaft, said second output shaft connected to a second of said pair of drive wheels, said third and fourth bevel gears driven by said second pair of pinion gears; and control means for controlling the rotational speed of said first and second drive motors to thereby provide variation in the torque and the speed rotation of said vehicle drive wheels, said control means comprising controllable speed reference signal producing means, and closed loop speed control means associated with each of said first and second amplidynes and said first and second drive motors, said speed control means connected to and responsive to said speed reference signal producing means.

5. The system as defined in claim 4 in which said control means cooperates with said drive motors to produce a high driving torque to said vehicle drive wheels at a low rpm thereof, to produce a continuous variation in rpm of said vehicle drive wheels from zero to a selected rpm, and to maintain such selected rpm.

6. The system as defined in claim 4 in which said first and second output shafts will not rotate when the rpm of said first drive motor is equal to the rpm of said second drive motor and said drive motors are operating with opposite directions of rotation.

7. The system as defined in claim 1 in which said controllable speed reference signal producing means includes a torque reference means and an acceleration reference means.

8. The system as defined in claim 7 in which said control means further comprises:

first amplidyne control means connected to said first amplidyne control input and second amplidyne control means connected to said second amplidyne control input, said first amplidyne control means connected to said first drive motor forming a first of said closed loop control means and said second amplidyne control means connected to said second drive motor forming a second of said closed loop control means;

said reference means is connected to said first and second closed loop control means; and said torque reference means is connected to said acceleration reference means;

whereby the algebraic sums of reference signals from said torque reference means and reference signals from said acceleration reference means controls said first and second amplidyne control means to determine the torque and rpm of said vehicle drive wheels.

9. The system as defined in claim 8 in which:

said torque reference means includes a variable speed torque motor driving a first synchro generator and a second synchro generator;

said acceleration reference means includes a variable speed torque reference motor driving a first differential synchro generator and a second differential synchro generator, said first differential synchro generator connected to receive an output from said first synchro generator and said second differential synchro generator connected to receive an output from said second synchro generator wherein the output phasing of said first synchro generator is opposite from the output phasing of said second synchro generator; and said first amplidyne control means is a control synchro transformer driven from said first drive means and connected to receive an input from the output of said first differential synchro generator, said second amplidyne control means includes a second control synchro transformer driven by said second drive motor and connected to receive an input from the output of said second differential synchro generator;

whereby said first control synchro transformer and said second control synchro transformer produce error control signals to their respective amplidyne control inputs for controlling the rpm of said first and second drive motors.

10. The system as defined in claim 9 which further comprises:

acceleration control means for selectively varying the speed of said acceleration motor and said torque motor; and operator control means connected to said acceleration control means for permitting an operator to selectively vary the speeds of said acceleration motor and said torque motor.

11. The system as defined in claim 10 in which said acceleration control means comprises:
first motor control means connected to said torque motor for controlling said torque motor to have a maximum rpm when the vehicle is stationary and to control said torque motor to continuously reduce its rpm when the vehicle is accelerating;
second motor control means connected to said acceleration motor for controlling said acceleration motor to have zero rpm when the vehicle is stationary and to control said acceleration motor to continuously increase its rpm during acceleration of the vehicle; and
said first motor control means is adapted to maintain said torque motor at a constant rpm less than the maximum rpm when the vehicle is maintaining an essentially constant speed, and said second motor control means is adapted to maintain said acceleration motor at a constant rpm greater than zero when the vehicle is maintaining an essentially constant speed.

12. The system as defined in claim 11 in which:
said first motor control means includes a first single phase synchro having ac excitation provided thereto and having a first rotatable control winding producing a constant ac output voltage variable in phase from 0° to 90°, and a first silicon controlled rectifier connected to a source of ac power having a control electrode connected to said control winding of said first synchro and an output connected to said torque motor whereby varying of the phase of said first control winding of said first synchro causes said silicon control rectifier to provide a variable dc voltage to said torque motor; and
said second motor control means includes a second single phase synchro having ac excitation applied thereto and having a second rotatable control winding producing a constant ac output voltage variable in phase from 90° to 0° and a second silicon control rectifier connected to the source of ac power having a control electrode connected to said second control winding of said second synchro and an output connected to said acceleration motor whereby varying the phase of said second control winding of said second synchro causes said second silicon control rectifier to provide a variable dc voltage to said acceleration motor.

13. The system as defined in claim 12 in which said operator control means includes:
(a) an operator control device;
(b) a variable speed reversible control motor operatively connected to rotate said first single phase synchro control winding and said second single phase synchro control winding so as to simultaneously cause the phase of said first control winding to increase within the range of 0° to 90° while said second control winding is decreasing in the range from 90° to 0°;
(c) third motor control means connected to control said control motor to turn in a first direction;
(d) fourth motor control means connected to control said control motor to turn in the opposite direction; and
(e) clutch means connected between said operator control means and said third and fourth motor control means for causing said third motor control means to drive said control motor in the first direction when said operator control device is moved in a first direction and to cause said fourth motor control means to control said motor to operate in the opposite direction when said operator control device is moved in the opposite direction.

14. The system as defined in claim 13 in which the phase between said first control winding and said second control winding is 90°.

15. The operator control means as defined in claim 13 in which:
said operator control device is a foot pedal;
said third motor control means includes a third single phase synchro having ac excitation and a third control winding producing a constant ac voltage output variable in phase from 90° to 0°, said third synchro biased to have the phase of said third control winding at 90° when the vehicle is not accelerating, and a third silicon control rectifier connected to a source of ac power having a control electrode connected to said third control winding whereby said third control winding controls said third silicon control rectifier to apply a varying dc voltage to a counterclockwise input of said reversible control motor;
said fourth motor control means includes a fourth single phase synchro having ac excitation and a fourth control winding producing a constant ac voltage output variable in phase from 90° to 0°, said fourth synchro biased to have the phase of said fourth control winding at 90° when the vehicle is not accelerating, and a fourth silicon control rectifier connected to a source of ac power and having a control electrode connected to said fourth control winding whereby said fourth control winding controls said fourth silicon control rectifier to apply a varying dc voltage to a clockwise input of said control motor; and
said clutch means includes a first clutch operatively connected between said foot pedal and said third synchro in which depressing of said pedal causes engagement of said first clutch to rotate said third control winding to decrease the phase of the output voltage to cause the counterclockwise input of said control motor to be energized, and in which release of pressure on said pedal disengages said first clutch causing said third synchro control winding to return to the 90° phase position, deenergizing said counterclockwise input and a second clutch operatively connected between said pedal and said fourth synchro in which the return of said pedal to its non-operated condition causes engagement of said second clutch to rotate said fourth control winding to decrease the phase of the output voltage to cause the clockwise input of said control motor to be energized, said clutch adapted to disengage when pressure is removed from said pedal causing said fourth synchro control winding to return to the 90° phase position, deenergizing said clockwise input.

16. A transmissionless drive system for vehicles comprising in combination:
a prime mover;
first and second amplidynes connected to and driven by said prime mover, each of said amplidynes having an input for a control signal for controlling the output voltage thereof;

a first drive motor electrically connected to the output of said first amplidyne;

a second drive motor electrically connected to the output of said second amplidyne;

a double differential unit having an outer differential including a first bevel gear driven by said first drive motor, and a second bevel gear driven by said second drive motor, and an inner differential driven by said outer differential including a third bevel gear connected to a first output shaft, and a fourth bevel gear connected to a second output shaft;

a spider having pinion gears for coupling said first and second bevel gears to said third and fourth bevel gears;

a pair of vehicle drive wheels connected to said first and second output shafts;

a variable speed torque motor driving a first synchro generator and a second synchro generator;

a variable speed acceleration reference motor driving a first differential synchro generator and a second differential synchro generator, said first differential synchro generator connected to receive an output from said first synchro generator and said second differential synchro generator connected to receive an output from said second synchro generator in an opposite phase to said connection of said first differential generator and said first synchro generator;

a first control synchro transformer driven from said first drive motor and connected to receive an input from the output of said first differential synchro generator, said first control synchro transformer having an error signal output operatively connected to said control signal input of said first amplidyne for thereby controlling the speed of said first drive motor to be equal to the sum of the speed of said torque motor and said acceleration motor; and a second control synchro transformer driven by said second drive motor and connected to receive an input from the output of said second differential synchro generator, said second control synchro transformer having an error signal output operatively connected to said control signal input of said second amplidyne for thereby controlling the speed of said second drive motor to be equal to the difference between the speed of said torque motor and said acceleration motor;

whereby said double differential causes said first and second drive shafts to rotate at the speed of said acceleration motor and said control means cooperates with said drive motors to produce a high driving torque to said vehicle drive wheels at a low rpm thereof, to produce a continuous variation in rpm of said vehicle drive wheels from zero to a selected rpm, and to maintain such selected rpm.

* * * * *